UNITED STATES PATENT OFFICE 2,089,043

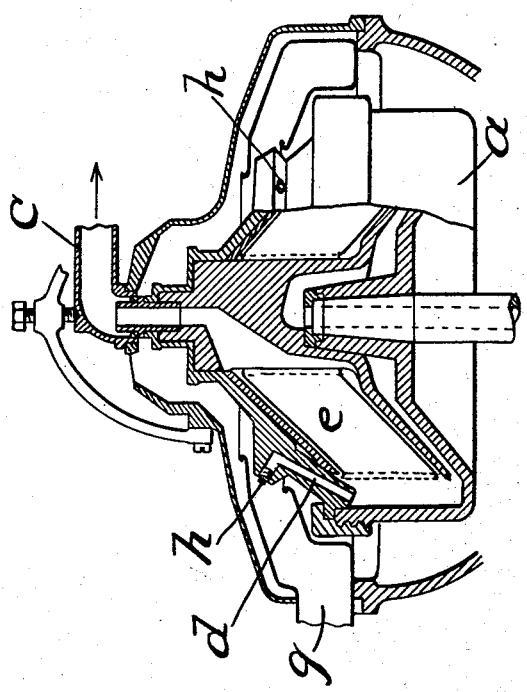
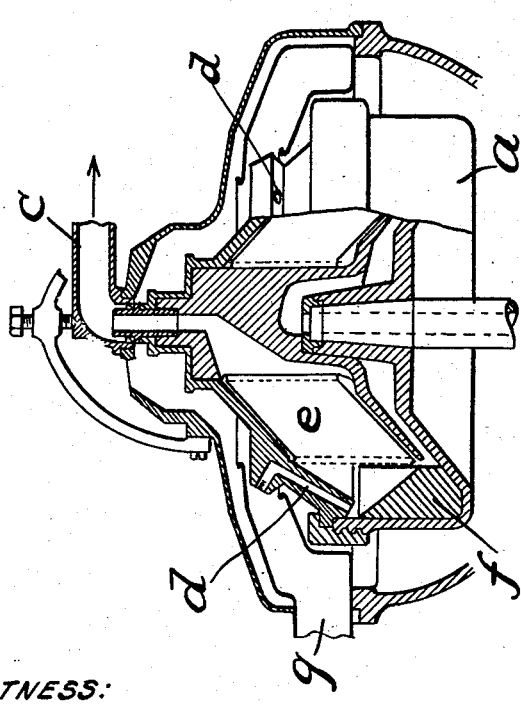
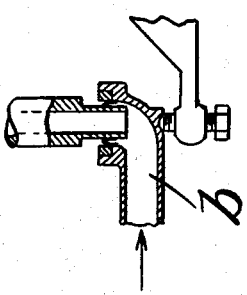

PROCESS OF PURIFYING FRUIT JUICES

Nils Edvin Svensjö, Alsten, Sweden, assignor to The De Laval Separator Company, New York, N. Y., a corporation of New Jersey Application January 8, 1936, Serial No. 58,032
In Germany January 9, 1935

4 Claims. (Cl. 99—105)

The purification of fruit juices, for instance, juices used for wine production, has heretofore mainly been made by means of gravity settling or filtration.

It would, however, of course, mean great economical advantages if the fruit juice could be quickly and effectively purified by centrifugal treatment. Experiments in this direction have also been made, but it has been found that the fruit juice, when treated in the ordinary open type centrifuge, does not have the same high quality that is attained with the older method.

This reduction of the quality seems to depend upon a disadvantageous influence of the air, which during the centrifugal treatment comes into intimate contact with the fruit juice. It is also possible that the fruit juice contains solid constituents which, when the juice is being fed into the open centrifugal bowl, are split up, so that they cannot afterwards to the same degree be centrifugally separated from the fluid constituents of the fruit juice.

The main object of the centrifugal treatment of fruit juice is to remove slime particles, contained in the liquid as impurities. In some cases, however, it is also desirable to separate the fruit juice into two or more components of different specific gravity, and in the case of fermented fruit juices, finally, the yeast cells should be removed.

The present invention relates to a method of treating fruit juices in centrifugal separators in such a way that the disadvantages above mentioned are avoided.

In practicing the invention, I use for the separating treatment a centrifuge the bowl of which is in air-tight connection with the inlet pipe of the centrifuge and which also may be in air-tight connection with one or more of its outlet pipes.

In case a too violent mechanical action on the fruit juice must be avoided, it is above all necessary to treat it in a centrifuge in which the inlet pipe of the bowl is tightly connected to the corresponding fixed supply pipe line. It thereby becomes possible to supply the liquid under a certain pressure, so that the centrifugal bowl during operation is kept filled with liquid, which is advantageous, as experience has shown that a violent action on the liquid flowing into the bowl is thereby avoided. For this purpose it is, however, not necessary that the outlet or outlets from the bowl should be tightly connected to the fixed outlet pipes. It is, however, sometimes advantageous to prevent the fruit juice, which has been treated in the centrifuge, from coming into intimate contact with the air, and in that case the centrifuge should have its outlet or outlets, as well as its inlet, tightly connected to the corresponding fixed pipes. The centrifuge thus becomes completely closed, so that the fruit juice does not at any point come into contact with the air, nor is it subjected to a violent mechanical action in the machine.

The removal by centrifugal treatment from fruit juice of undesirable constituents, that is, sludge particles and the like, which are heavier than the fruit juice proper, may be effected in ways, each involving a procedure which by itself has been used in other processes. The first procedure is to use a bowl provided with sludge outlets at the outer portion of the bowl, usually through its peripheral wall; that is to say, at a great distance from the rotation axis. The sludge outlets usually consist of fine nozzles, through which the sludge is pressed out together with part of the liquid contents of the bowl, in this case the fruit juice. With this arrangement it cannot be avoided that a greater or lesser proportion of the liquid from which the sludge particles are to be separated is lost together with the sludge, and special steps must therefore be taken to recover this quantity of liquid, which steps may be both quite expensive and rather ineffective. It is practicable, however, to avoid loss of fruit juice by practicing the other known procedure, according to which a bowl without a sludge outlet is used. The sludge in this case deposits in the sludge space of the bowl. The disadvantage of this arrangement is that the sludge space, after a shorter or longer period, often a very short period, becomes filled, so that the centrifuge must be stopped and the bowl disassembled and cleaned.

In the purification of fruit juices, I have found it practicable and decidedly advantageous to combine these two methods in such a way that the fruit juice is first allowed to pass through a nozzle bowl, in which a certain proportion (preferably the main proportion) of the sludge discharges through the sludge nozzles. If a clean or complete separation of the sludge were effected, it would involve the discharge with the sludge of a considerable proportion of the fruit juice. If, however, as in my process, only an incomplete separation of the sludge is effected, it involves the loss with the sludge of a minimum proportion of fruit juice. The incompletely purified fruit juice flows out through an outlet or outlets close to the rotation axis of the bowl. The incompletely purified fruit juice is then treated in a centrifuge of the type whose bowl is not provided with sludge nozzles and in which the remaining sludge deposits in the sludge space of the bowl. With this arrangement the advantage is attained that the first centrifuge need never be stopped for cleaning, while the second centrifuge need be cleaned much less frequently than if it alone were used to effect whole purifying process.

When fruit juice is purified by gravity settling, there is formed in the settling tanks a bottom layer of sludge which contains a good deal of fruit juice, and it would therefore pay to extract the juice. Such bottom sediment may be treated in centrifuges of the above types. In the treatment of such sediment it is of great importance that the centrifugation be carried out in two stages, the first stage consisting in the removal of the main part of the sludge in a centrifuge the bowl of which is provided with sludge nozzles, whereupon the partly purified fruit juice is further treated and completely purified in a centrifuge the bowl of which has no sludge nozzles.

It is possible to carry out the process in a single centrifuge of a size capable of handling a much greater quantity of fruit juice than is required to be purified, provided the centrifuge is so constructed that it may be readily converted from one of the two above described types to the other. In the separator used for treatment in two stages the bowl may be provided with a removable lining or filler which is applied, and conforms in shape, to the sludge space. The filler may be provided with funnel-like depressions communicating with the sludge nozzles, so that after the lining has been inserted the sludge space is bounded by walls which are inclined towards the outlets, that is, form an angle with the radius through the outlets which makes the sludge slide towards the said outlets. Before re-treatment of the thus partly purified fruit juice, this filler is removed and the sludge nozzle closed, and in re-centrifugation the separated remaining sludge is deposited upon and accumulates on the peripheral wall of the bowl. In carrying out the two stages of the process in such a convertible bowl, better results are often secured than by practicing the process continuously in two separators.

The process may be practiced in open bowls or in bowls provided with multiple conical discs. In the ordinary disc liner the cones extend at a comparatively sharp angle to the axis of the bowl. This type of bowl has proved unsuitable, as the space between the discs comparatively quickly became clogged by impurities in the juice. For this reason bowls provided with cylinder-shaped inner fittings were found preferable. Subsequent tests showed, however, that bowls provided with conical discs can be used provided that half the top angle of the cone is greater than 40 degrees. It was found that the impurities were of such character that they would slide along the lower side of the discs into the sludge space of the bowl, if the said angle is greater than 40 degrees, while they would stick to the discs and clog the interspaces if the angle is smaller. A bowl provided with conical discs has a considerably higher separating efficiency than a cylinder bowl, and the use of a bowl provided with conical discs of the angularity specified gave the best results.

While, as is evident from the above description, the process does not require for its execution a bowl or bowls of any particular specific construction, I have shown in the drawing two bowls, one of which is adapted to carry out the first stage of the process and the other of which is adapted to carry out the second stage of the process. The first bowl is so constructed that by, the removal of the lining or filler in the sludge space it may be converted into the second bowl. It will, therefore, be understood that the drawing may be taken to illustrate two separate bowls within which the entire process may be conducted successively and continuously, or one convertible bowl within which the two stages of the process may be practiced successively but discontinuously.

Fig. 1 is a vertical sectional view of the first centrifuge above described.

Fig. 2 is a vertical sectional view of the second (or converted) centrifuge above described.

Fig. 3 is a plan view of the removable lining or filler.

Each centrifuge is shown as of the "closed" type and comprises a rotatable bowl $a$ having airtight connection with a fixed inlet pipe $b$ and (preferably also) with a fixed outlet pipe $c$. Through the bowl wall, preferably through the bowl hood, is provided channels or nozzles $d$ (one of which is shown) the lower end of each of which opens into the sludge space of the bowl, the nozzles extending upward, and inward relative to the bowl's axis, and thence outward through a thickened part of the bowl hood. $e$ represents the pile of conical discs whose half top angle is greater than 40 degrees. In the bowl of Fig. 1 a lining or filler $f$ is inserted and fits within the sludge space of the bowl. This filler is provided with channels whose bottoms and sides converge toward the nozzles $d$. Through these nozzles the greater part of the sludge, with but little of the fruit juice, is discharged into an annular receptacle $g$, while the fruit juice, containing the remainder of the sludge, discharges through the outlet pipe $c$.

Fig. 2 represents a separator devoid of a filler or lining $f$ or from which the filler or lining $f$ has been removed. This separator is unprovided with discharge nozzles, or if it is assumed to be a separator of the convertible type, each nozzle has been closed by a stopper $h$, applied either at the inlet or outlet end of the nozzle.

In the claims, I have used the word "sludge" as definitive of all the impurities, mostly solid, which it is the object of the invention to remove from the fruit juice.

What I claim and desire to protect by Letters Patent is:

1. The process of purifying fruit juices which comprises continuously separating therefrom by centrifugal force a major portion of the solids therein and continuously separately removing both the solids and the juice, containing a minor proportion of solids and thus partially purified, from the locus of separation, and then by centrifugal force separating the remaining solids from the partially purified juice and retaining them adjacent the locus of separation while continuously removing the purified juice from said locus.

2. The process of purifying fruit juices which comprises subjecting the same to centrifugal force and thereby separating the solids and juice while continuously removing from the locus of separation a major portion of the separated solids mixed with little or substantially no juice and a major proportion of the juice mixed with a minor proportion of the solids, subjecting the latter mixture to centrifugal force and thereby separating the solids and juice while continuously removing from the locus of separation the separated juice and retaining the separated solids adjacent the locus of separation.

3. The process set forth in claim 1 wherein the partly purified fruit juice which is separated in the first centrifugal operation is maintained out of contact with the atmosphere between the two centrifugal operations.

4. The process set forth in claim 2 wherein the partly purified fruit juice which is separated in the first centrifugal operation is maintained out of contact with the atmosphere between the two centrifugal operations.

NILS EDVIN SVENSJÖ.